(12) United States Patent
Lan (10) Patent No.: US 9,345,347 B2
(45) Date of Patent: May 24, 2016

(54) HOLDING DEVICE WITH A SECURING SHEET FOR MOUNTING ONTO A WALL

(76) Inventor: Yung-Huei Lan, San Jose, CA (US)

( * ) Notice: Subject to any disclaimer, the term of this patent is extended or adjusted under 35 U.S.C. 154(b) by 0 days.

(21) Appl. No.: 12/583,220

(22) Filed: Aug. 17, 2009

(65) Prior Publication Data

US 2010/0038502 A1 Feb. 18, 2010

Related U.S. Application Data

(62) Division of application No. 11/200,825, filed on Aug. 9, 2005, now Pat. No. 7,575,208.

(51) Int. Cl.
*A47G 1/17* (2006.01)
*A47G 25/06* (2006.01)
*F16B 47/00* (2006.01)

(52) U.S. Cl.
CPC .............. *A47G 1/17* (2013.01); *A47G 25/0635* (2013.01); *F16B 47/00* (2013.01); *Y10T 428/24008* (2015.01); *Y10T 428/24174* (2015.01); *Y10T 428/24182* (2015.01)

(58) Field of Classification Search
CPC ...... F16B 47/00; F16B 47/003; F16B 47/006; A47G 1/17; B25B 11/005; B65G 49/061; B60R 2011/0056
USPC ............ 248/205.3–8, 206.1, 206.2, 364, 683; 428/99, 119, 120
See application file for complete search history.

(56) References Cited

U.S. PATENT DOCUMENTS

| | | | | |
|---|---|---|---|---|
| 2,233,870 A * | 3/1941 | Muter | ......................... | 248/205.8 |
| 2,542,101 A * | 2/1951 | Suben | ............................ | 451/388 |
| 3,051,117 A * | 8/1962 | Hunter, Jr. | .................... | 114/296 |
| 4,133,575 A * | 1/1979 | Mader | ........................... | 296/95.1 |
| 4,170,995 A * | 10/1979 | Levine et al. | ................. | 604/180 |
| 4,842,912 A | 6/1989 | Hutter, III | ....................... | 428/65 |
| 5,014,946 A * | 5/1991 | Gruber | ....................... | 248/206.5 |
| 5,133,524 A * | 7/1992 | Liu | ............................. | 248/205.8 |
| 5,275,367 A | 1/1994 | Frye | ............................ | 248/205.3 |
| 5,318,262 A * | 6/1994 | Adams | ....................... | 248/205.8 |
| 5,593,120 A * | 1/1997 | Hamerski | .................. | 248/205.3 |
| 5,909,758 A * | 6/1999 | Kitamura | ........................ | 16/406 |
| 6,045,111 A * | 4/2000 | Hsieh | ............................ | 248/551 |
| 6,308,923 B1* | 10/2001 | Howard | ..................... | 248/205.5 |
| 6,669,033 B1* | 12/2003 | Lian | ............................ | 211/87.01 |
| 7,226,026 B2* | 6/2007 | Lin | ............................. | 248/205.5 |

* cited by examiner

*Primary Examiner* — Kimberly Wood
(74) *Attorney, Agent, or Firm* — WPAT, PC; Justin King (57) ABSTRACT

A support for mounting an article onto a wall. The support includes a body with apparatus for holding or hanging the article. An impervious securing sheet is connectable airtightly onto the wall and extends outwardly beyond a backside of the body. A friction plate is connected to the body and to the securing sheet. If the friction plate and the securing plate pull away from the wall, a negative pressure prevents the article from falling.

1 Claim, 14 Drawing Sheets

HOLDING DEVICE WITH A SECURING SHEET FOR MOUNTING ONTO A WALL

1. CROSS REFERENCE TO RELATED APPLICATIONS

The instant application is a divisional application of Continuation-In-Part application Ser. No. 11/200,825, filed Aug. 9, 2005, now U.S. Pat. No. 7,575,208 entitled HOLDING DEVICE WITH A SECURING SHEET FOR MOUNTING ONTO A WALL, and incorporated herein by reference thereto.

2. BACKGROUND OF THE INVENTION

A. Field of the Invention

The embodiments of the present invention relate to a holding device, and more particularly, the embodiments of the present invention relate to a holding device for mounting onto a wall.

B. Description of the Prior Art

A holding device for mounting onto a wall is a device mounted onto a wall surface for holding or hanging something, such as a coat and hat hook, a soap holder, a bathroom towel rack, and the like.

The known holding devices for mounting onto a wall generally include a base and a holder with an appropriately shaped bracket connected with the base for holding or hanging commodities. The base of the holder of the holding device for a wall has to be securely and durably fixed on a wall in order to hold commodities securely, but not to damage and affect the surface of the wall.

In the prior art, the base is fixed onto a wall by hammering nails into the wall, adsorbing thereon with suction by an acetabula, or cementing thereon with a sheet having glue at its double faces, hot-melt adhesive, and the like. The wall surface sometimes, however, would be prone to be damaged if the base is fixed by hammering nails into the wall, the adsorbing force and duration is not ideal due to the limitation of the area and the air tightness of the acetabula if the base is fixed by adsorbing thereon with the acetabula, while the fastness is not satisfactory due to the limitation of the adhesive force if the base is fixed by cementing thereon with a sheet having glue at its double faces or hot-melt adhesive.

Another adhesive sheet type holding device is taught by U.S. Pat. No. 5,275,367 in which a PVC adhesive sheet with a large area provided under a base is attached to a wall. Since the contacting area between the device and the wall is increased, the adsorption affinity is increased.

A further adhesive sheet type holding device is taught by U.S. Pat. No. 4,842,912 in which the holding device is also attached to a wall through an adhesive sheet with large area. Further, the adhesive sheet includes an interlayer, and the base is disposed between the interlayer and the adhesive sheet. The bearing capacity of the holding device, however, is greatly restricted due to the limitation of the adsorption affinity with a wall since the area and the strength of the adhesive sheet is limited.

3. SUMMARY OF THE INVENTION

It is an object of the embodiments of the present invention to overcome the above disadvantages and to provide an adhesive sheet type holding device for mounting onto a wall, which can be securely and durably fixed onto a wall without any damage to the wall.

In order to prevent the object hung on the holder from falling down, an upward force equal to the weight of the object has to be provided. The air pressure provides a horizontal force, i.e., a normal force that is necessary for a friction force and which presses the base and the adhesive sheet under the base against the wall so that a static upward friction force is generated between the wall and the adhesive sheet. The upward force to prevent the object from falling down is provided by adhesive and the friction force if the adhesive sheet has adhesive on its back side.

As long as the maximal static friction force is equal to the weight of the object, falling of the object can be prevented. According to the analysis of the forces acting on the device, friction plates are provided by the side of—at the left side, right side, upper side, and lower side of—the plate-shaped base to improve the effect of the friction and to increase the friction force.

In order to achieve the above object, the embodiments of the present invention provide an adhesive sheet type holding device for mounting onto a wall, which includes a base, a holder that is made in the shape of an appropriate support and attached to the base, and an adhesive sheet that has a well air tightness and can be tightly attached on a wall. The adhesive sheet is attached to the base, with the surface of the adhesive sheet extended outwards beyond the edge of the base. The device further includes a friction plate connected with the base, and a material with a high coefficient of friction is provided on the surface of the friction plate, which is towards the wall.

In the holding device according to the embodiments of the present invention, at least one friction plate is connected with the base by movable joints and is attached on the front side of the adhesive sheet.

In the holding device according to the embodiments of the present invention, the friction plate is directly pressed against the wall, beyond the area of the adhesive sheet.

The most important function of the adhesive sheet is to provide an air-tight effect. The adhesive sheet may be paper and film provided on the back side thereof with adhesive or a fluxible solid—ropy or gelatiniform—filling substance, or the adhesive sheet may be a electrostatic paster with no adhesive on the back side thereof and with a highly smooth surface. The electrostatic paster can be used for smooth wall surfaces, such as glass, ceramic tile, and plastic and baking finish surface. The adhesive sheet with adhesive on its back can be used for the general wall surface, while the adhesive sheet with a fluxible solid filling substance on its back can be suitable for the rough surface since the filling substance can fill in the depressions on the surface so that the adhesive sheet with fluxible solid filling substance on its back can be tightly mounted on the wall.

In use, the adhesive sheet is attached onto a wall, coming into tight contact with the wall to achieve an excellent air-tight effect due to the adhesive on its back or the adsorption affinity of its surface. When the holder bears an object, the force applied to the base causes the adhesive sheet to be detached from the wall and generates a negative pressure clearance between them. The base and the adhesive sheet is pressed against the wall due to the air pressure so that the holding device can be fixed on the wall securely and durably.

In the adhesive sheet type holding device according to the embodiments of the present invention, at least one friction plate connected with the base is provided. When the holder connected to the base bears an object, since the base connected with the friction plates is movable, in the case that the force is applied to the base and the adhesive sheet connected with the base produces a trend to separate from the wall, the friction plates push or pull the base through the joints so that the desquamating of the base can be prevented. Therefore, the adhesive force between the adhesive sheet holding device and the wall can be enhanced so that the bearing capacity of the device is improved.

4. BRIEF DESCRIPTION OF THE DRAWINGS

The figures of the drawing are briefly described as follows.

5. DETAILED DESCRIPTION OF THE PREFERRED EMBODIMENTS

In the first embodiment of the present invention, the friction plate is connected with the base through movable joints and is attached on the front surface of the adhesive sheet.

The above joints may be a bendable hinge or an appropriate cam structure. When the cam structure is used for the joints, it can cause the base and friction plates to laterally move with respect to each other when the base moves towards the friction plates so that the base and the adhesive sheet connected with the base is lifted up and separated from the wall surface, but the friction plate is maintained tightly attached to the wall. The cam structure may be a slope structure, or an inclined pushing piece mechanism, or the like.

The cam should be provided at the middle position of the junction of the base and the friction plates so that when the cam acts, the force applied by it is focused on the center position. As a result, the middle portion of the base adjacent to the friction plates uplifts higher than the other portions, while the margin portion is more adjacent to the wall so that the adhesive sheet of the margin of the base is only slightly pulled upwards and has less possibility to rupture.

In order to better be attached to a curved surface, the base can be divided into a plurality of sub-bases that are connected with one another by movable joints.

Figure 1:
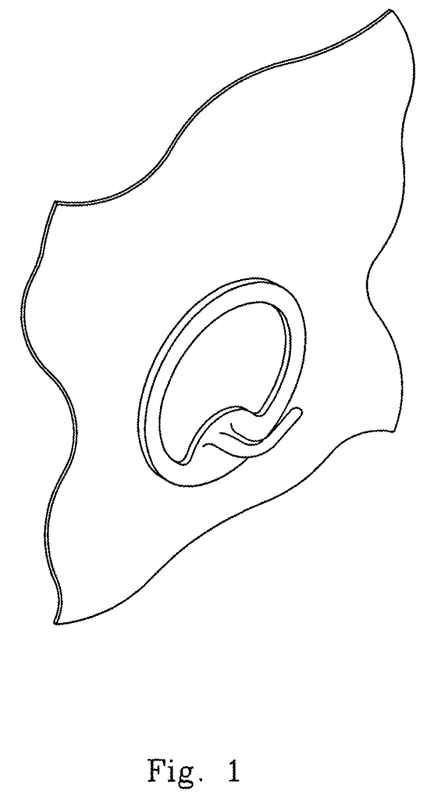
FIG. 1 is a diagrammatic front perspective view showing a kind of holding device with a securing sheet of the embodiments of the present invention.
Figure 2:
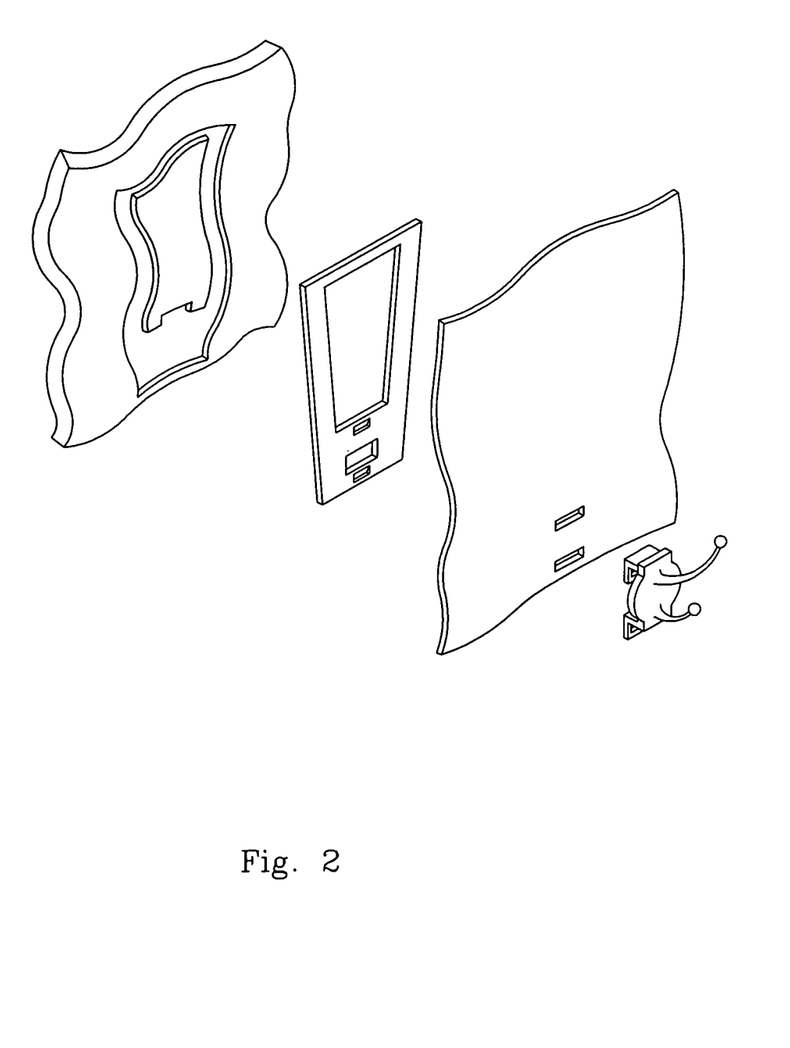
FIG. 2 is an exploded diagrammatic front perspective view showing another kind of holding device with a securing sheet of the embodiments of the present invention.
Figure 3:
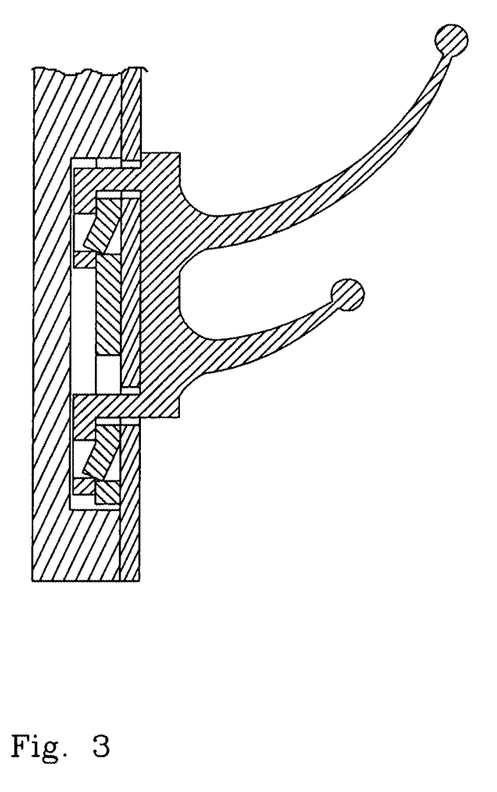
FIG. 3 is a diagrammatic cross sectional view showing the lower portion of the adhesive sheet type holding device shown in the FIG. 2 assembled.
Figure 4:
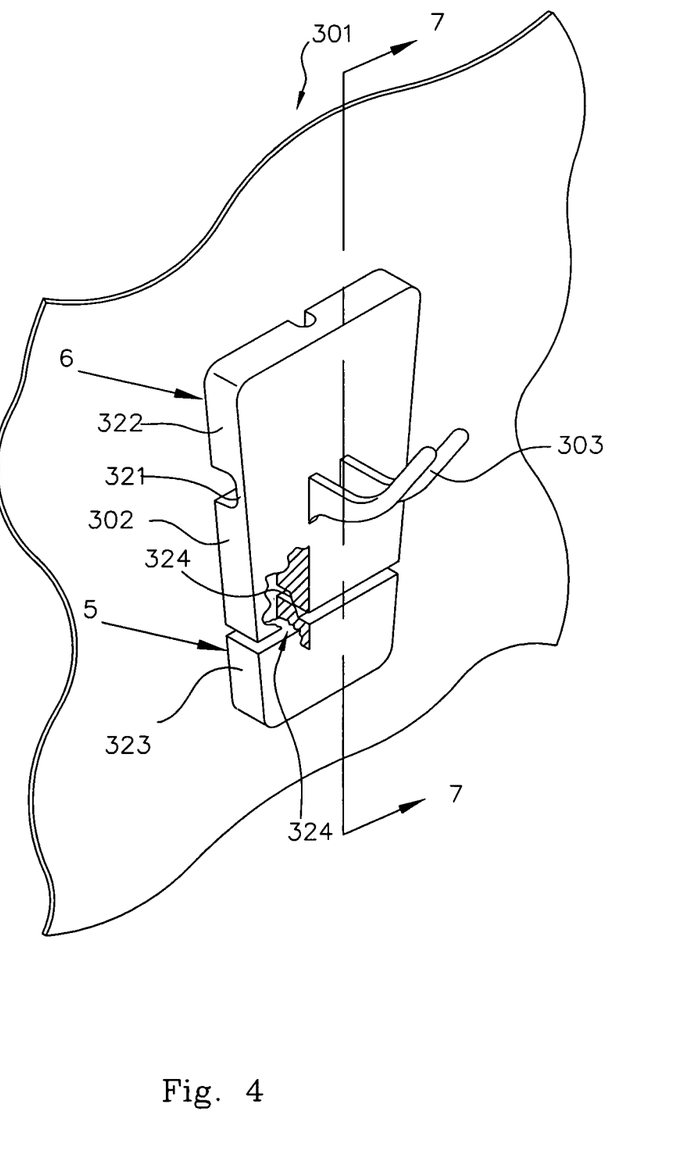
FIG. 4 is a diagrammatic front perspective view, in partial section, showing the adhesive sheet type holding device for mounting onto a wall according to a first embodiment of the present invention.
Figure 5:
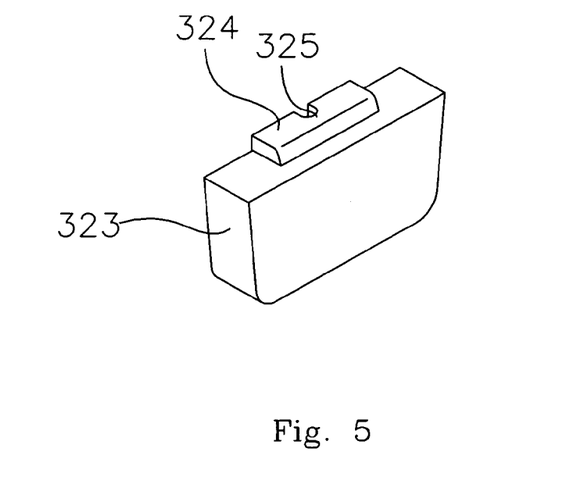
FIG. 5 is a diagrammatic rear perspective view showing the back of the lower friction plate of the adhesive sheet type holding device for mounting onto a wall taken generally in the direction of, and identified by, ARROW 5 in FIG. 4.
Figure 6:
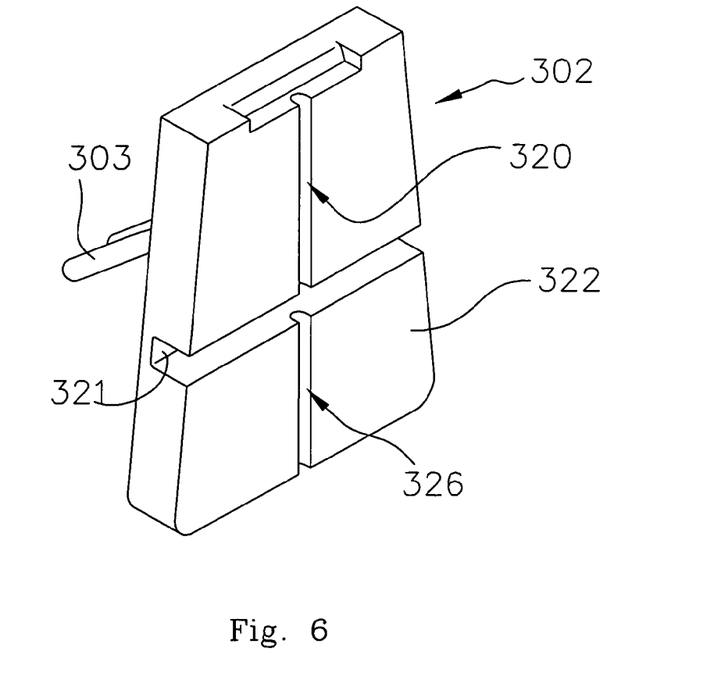
FIG. 6 is a diagrammatic inverted rear perspective view showing the back of the base and the upper friction plate of the adhesive sheet type holding device for mounting onto a wall taken generally in the direction of, and identified by, ARROW 6 in FIG. 4.

In the first embodiment of the present invention, as shown in FIGS. 4-6, an adhesive sheet type holding device for mounting onto a wall includes an adhesive paper sheet 301, a base 302 and a holder 303.

The adhesive paper sheet 301 is an electrostatic adhesive paper, i.e., an electrostatic paster, having a square shape. The base 302 having the shape of a plate is stuck on the front side of the adhesive paper sheet 301. The holder 303 is two side by side hooks that are adjacent to each other and which are connected to the base 302. The base 302 is provided with an upper friction plate 322 and a lower friction plate 323 attached to the front side of the adhesive paper sheet 301 on its upper portion and its lower portion, respectively. The upper friction plate 322 is connected with the base 302 through a hinge 321, and the lower friction plate 323 is connected with the base via a slope-shaped cam structure 324. The base 302, the upper friction plate 322, and the lower friction plate 323 are provided thereon with hinges 320, 326, and 325 formed by longitudinal grooves to be bent easily so that they can achieve a fight attaching to the curved wall surface.

Figure 7:
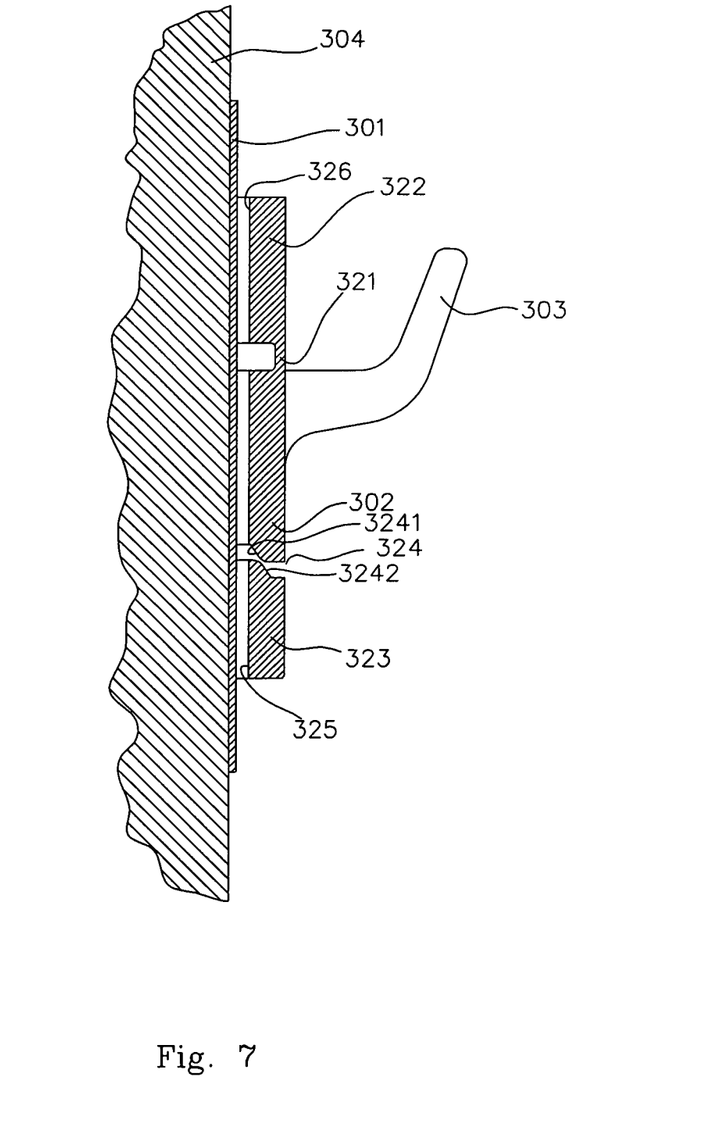
FIG. 7 is an enlarged diagrammatic cross sectional view taken along LINE 7-7 in FIG. 4 showing the adhesive sheet type holding device for mounting onto a wall.

When the holder 303 bears no load, as shown in FIG. 7, the base 302 is contacted with the wall surface and the upper slope 3241 has not yet contacted the lower slope 3242 of the cam structure 324. When a force is applied to the hooks, the base 302 moves downwards and the upper slope 3241 slides onto the lower slope 3242 along the slope so that the base 302 and the adhesive paper sheet 301 connected to the base 302 are detached from the wall 304.

Figure 8:
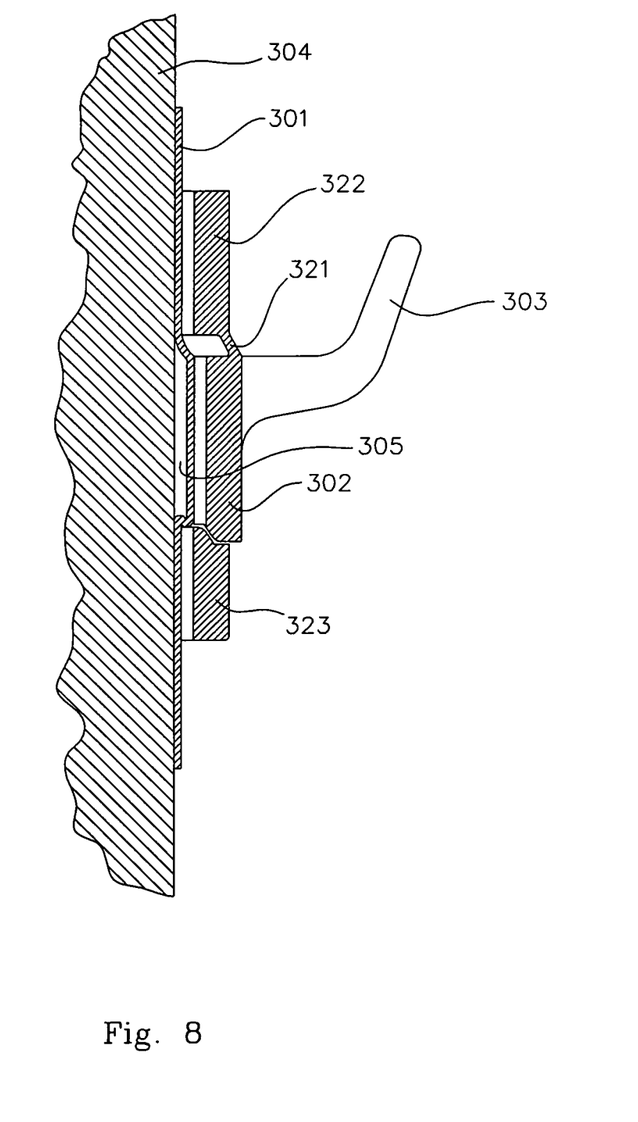
FIG. 8 is a diagrammatic cross sectional view showing the condition of forces acting on the adhesive sheet type holding device for mounting onto a wall shown in FIG. 7.
Figure 9:
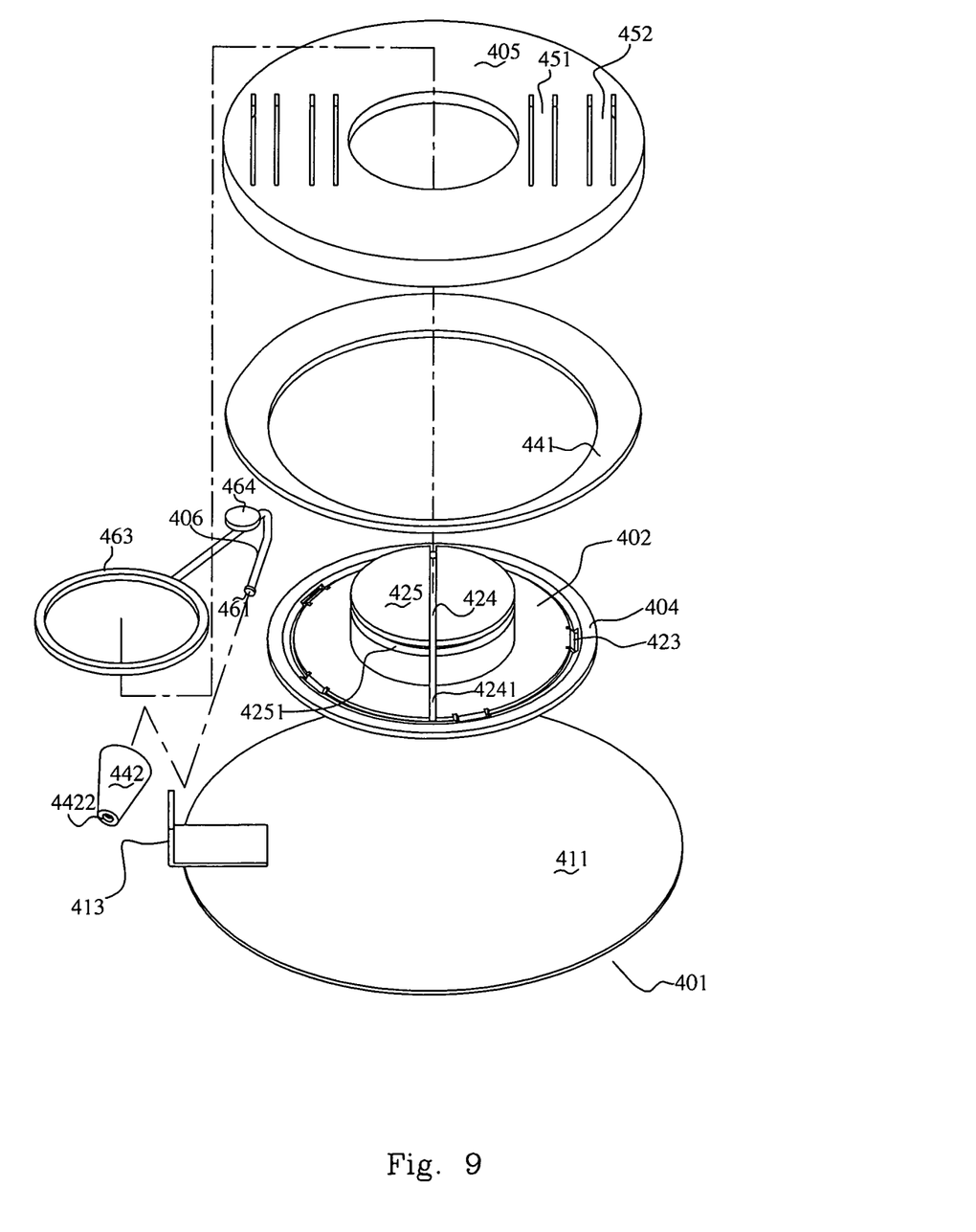
FIG. 9 is an exploded diagrammatic front perspective view showing the structure of the adhesive sheet type holding device for mounting onto a wall according to a second embodiment of the present invention.

A clockwise torque, as shown in FIG. 8, applied to the holder 303 is generated due to the force applied thereto and it causes the upper portion of the base 302 and the adhesive paper sheet 301 attached to the base 302 to be detached from the wall 304. As a result, the adhesive paper sheet 301 is pulled upwards by a little due to its elasticity so that negative pressure is generated in the clearance 305 between the adhesive paper sheet 301 and the wall 304, at the same time, negative pressure is also produced between the adhesive paper sheet 301 beneath the upper friction plate 322 and the lower friction plate 323 and the wall 304 so that the air pressure presses the friction plates and the adhesive paper sheet 301 beneath the friction plates against the wall 304. Thus, the resultant static friction force between the adhesive paper sheet 301 and the wall 304 produces an effect preventing the adhesive paper sheet 301 from sliding downwards so as to prevent the base 302 from falling.

The pressing roller device for ejecting the air between the adhesive paper sheet and the wall can further be provided in the embodiments of the present invention in order to keep well air tightness between the adhesive paper sheet and the wall.

Figure 10:
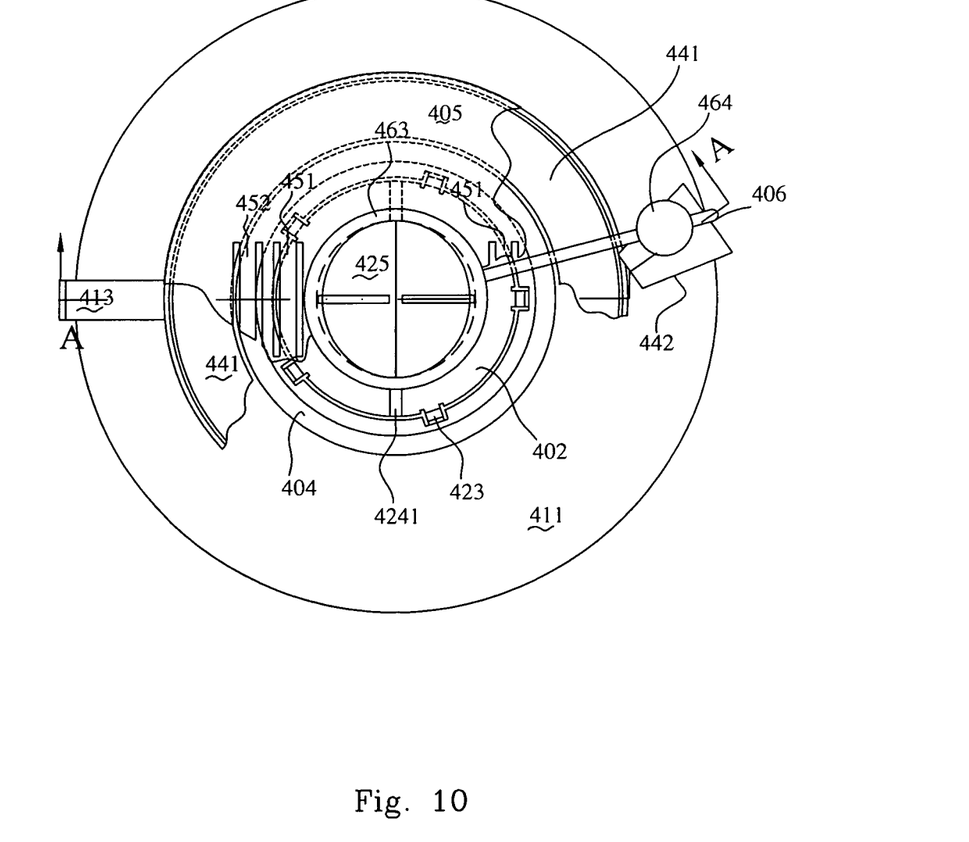
FIG. 10 is an enlarged diagrammatic top plan view, in partial section, showing the structure of the adhesive sheet type holding device for mounting onto a wall shown in FIG. 9 assembled.

In the second embodiment of the present invention, as shown in FIGS. 9-12, an adhesive sheet type holding device for mounting onto a wall includes an adhesive paper sheet 401, a base 402, a friction plate 404, a pressing ring 441, a pressing roller 442, a pressing plate 405, a peeling piece 413 and a holder 403 (only shown in FIG. 10).

The external surface 411 of the adhesive paper sheet 401 having a round shape is stuck on the surface of the base 402 pressing against the wall, and the surface of the friction plate 404 presses against the wall. In addition, the adhesive paper sheet 401 is provided with an adhesive on the internal surface thereof to be stuck on the wall. The base 402 having a round shape is provided with ligaments 423 on the periphery thereof and is connected with the friction plates 404 having the shape of a circular ring. Slopes engaging with each other are provided on the periphery of the base 402 and the internal periphery of the friction plate 404. When the base 402 moves outwards in any direction and meets with the friction plate 404, the slope of the base 402 rides on the slope of the friction plate 404 and thus the base 402 is pushed up and detached from the wall so that the adhesive paper sheet 401 attached to the base 402 follows the latter to depart from the portion of wall. At the portion, a negative-pressure clearance is generated between the adhesive paper sheet 401 and the wall and a negative pressure is also produced between the wall and the adhesive paper sheet 401 beneath the friction plate 404 adjacent to the portion due to the effect. As a result, the air pressure presses the friction plate 404 against the wall so that the adhesive paper sheet 401 beneath the friction plate 404 is tightly and securely pressed on the wall since the resultant friction force blocks its falling.

Figure 11:
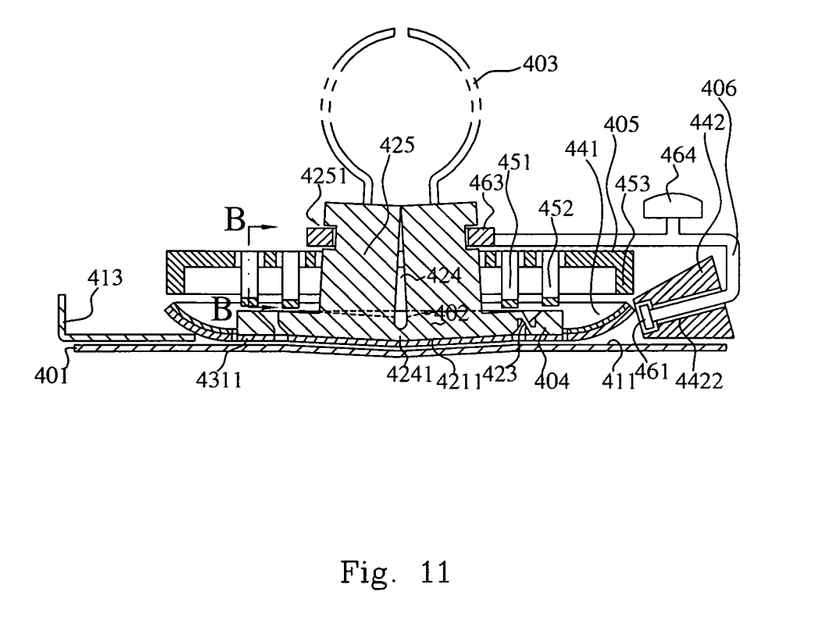
FIG. 11 is a diagrammatic cross sectional view taken along LINE A-A in FIG. 10.
Figure 12:
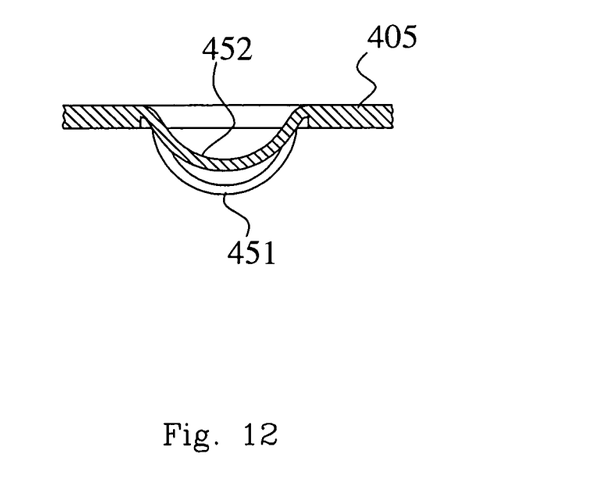
FIG. 12 is a diagrammatic cross sectional view taken along LINE B-B in FIG. 11.

The base 402 is provided at the center thereof with a groove 424 formed with a hinge 4241 on the lower end thereof. As shown in FIG. 11, the upper end of the groove 424 closes if no force is applied thereto, and the back side of the base 402, i.e., a press attaching surface 4211, is formed with a shape of a protrusion projected towards the wall downwardly. As a result, when the base 402 is pressed and attached onto the wall, the center portion of the base 402 firstly contacts with the wall so that the air between the adhesive paper sheet 401 and the wall is ejected outwards from the center portion.

In order to make the lower surface of the base 402 bent and to have a shape projecting downwards from the center thereof, beside the above hinge structure, the press attaching surface 4211 may be formed into a spherical surface projecting downwards, provided thereon with elastic material and a hollow chamber to be planished outwards from the center portion as the above.

Since it will take a long distance for the air to penetrate into the portion beneath the friction plate from the margin of the adhesive paper sheet around the friction plate 404, it can effectively improve the air-tight effect to press the adhesive paper sheet tightly on the wall.

In order to be tightly pressed on the wall, the adhesive paper sheet around the friction plate 404, provided around the friction plate 404 is the pressing ring 441 that has a ring shape with its inner ring projecting towards the adhesive paper sheet 401 and which may be made of elastic material, such as spring steel sheet. When the pressing ring 441 is pressed onto the wall, the center of the pressing ring 441 firstly presses the adhesive paper sheet 401 against the wall, and continuously pushing the pressing ring 441 causes the inner ring of the pressing ring 441 to be bent upwards and the entire pressing ring 441 gradually turns upwards so that the adhesive paper sheet 401 is continuously rolled toward the outer periphery thereof from the inner portion by the pressing ring 441, and the air is ejected so as to be pressed tightly on the wall.

The pressing plate 405 is disposed above the pressing ring 441 and is provided with two long springs having the shape of a arched plate, which are capable of pushing the base 402 and two short springs are capable of pushing the friction plate 404. A pressing foot 453 in a circular ring shape for pushing the outer edge of the pressing ring 441 is also provided around the pressing plate 405. Thus, as long as the pressing plate is pushed, the long springs 451 firstly presses the base 402 flatly against the wall, then the short springs 452 press the friction plate 404 against the wall, and next the pressing foot 453 pushes the pressing ring 441 so that the air between the adhesive paper sheet 401 and the wall is continuously squeezed out from the center to the outside of the adhesive paper sheet 401.

Since the wall surface may be uneven, a soft cushion 4311 can be provided on the surfaces of the base 402, the friction plate 404, and the pressing ring 441, which are pressed onto the wall so that the adhesive paper sheet 401 can be yieldingly pressed onto the wall.

Since the further portion around the adhesive paper sheet 401 has a large range if it is designed to press all of the adhesive paper sheet 401, the pressing ring 441 has to be big and the pressing roller 442 is also disposed on the base 402.

The pressing roller 442 has the shape of a roller and is provided at the axis thereof with a shaft hole 4422 through which a shaft 406 is disposed. One end 461 of the shaft 406 is big enough to prevent the pressing roller 442 from detaching from the shaft 406 and the other end is bent and connected to the circular ring 463. The circular ring 463 is fitted over a groove 4251 provided on the cylindrical portion 425 of the base 402 projecting upwards so that the pressing roller 442 can rotate around the base 402. In order to facilitate the rolling of the pressing roller 442 on the circular road, the rolling body of the pressing roller 442 is formed into an appropriate taper.

The pressing roller 442 can be pushed to rotate and pressed by griping a gripe 464 provided on the shaft 406. It can be seen from FIG. 10 that the axis of the pressing roller 442 is inclined by an angle with respect to the radius of the base 402. When the gripe 464 is griped and rotated clockwise, the closer the portion is to the center of the adhesive paper sheet 401, the more early the portion is pressed, while the farther the portion is from the center of the adhesive paper sheet 401, the later the portion is pressed. Thus, the air between the adhesive paper sheet and the wall can be squeezed out from the internal side to the external side. The pressing roller 442 is provided with soft material on the rolling surface so that the adhesive paper sheet 401 can be yieldingly pressed onto the wall.

A peeling piece 413 extending upwards is also provided on an edge of the outer surface of the adhesive paper sheet. The edge of the adhesive paper sheet can be pulled and detached from the wall and thus the whole holding device can be removed from the wall by pulling the peeling piece 413 up.

It has been proved by a test that the effect to prevent the holder from sagging will be better if the friction plate is directly pressed against the wall, instead of the adhesive paper sheet.

Figure 13:
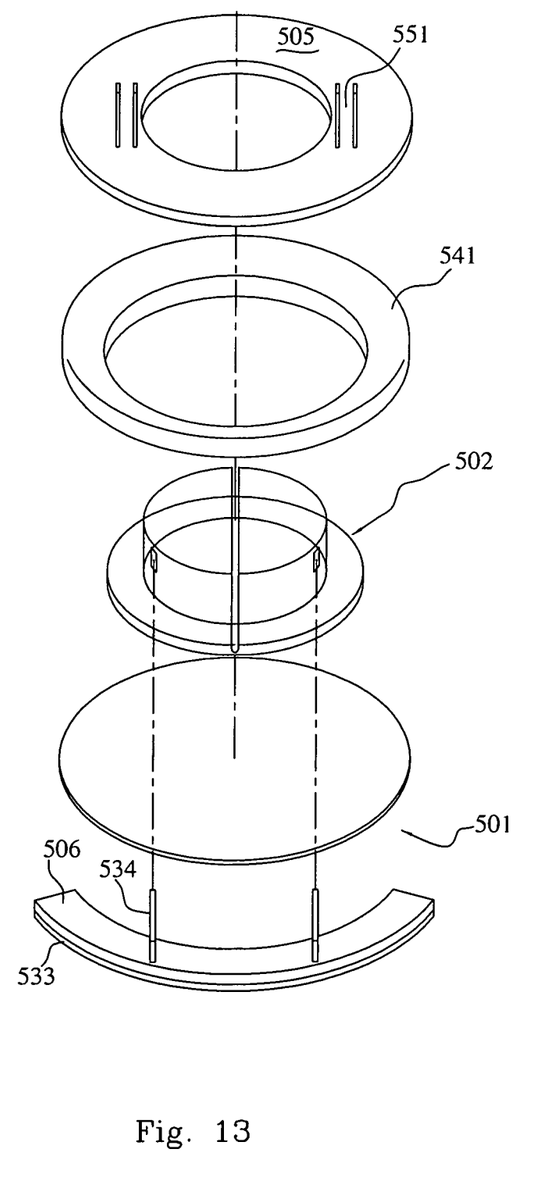
FIG. 13 is an exploded diagrammatic front perspective view showing the structure of the adhesive sheet type holding device for mounting onto a wall according to a third embodiment of the present invention.
Figure 14:
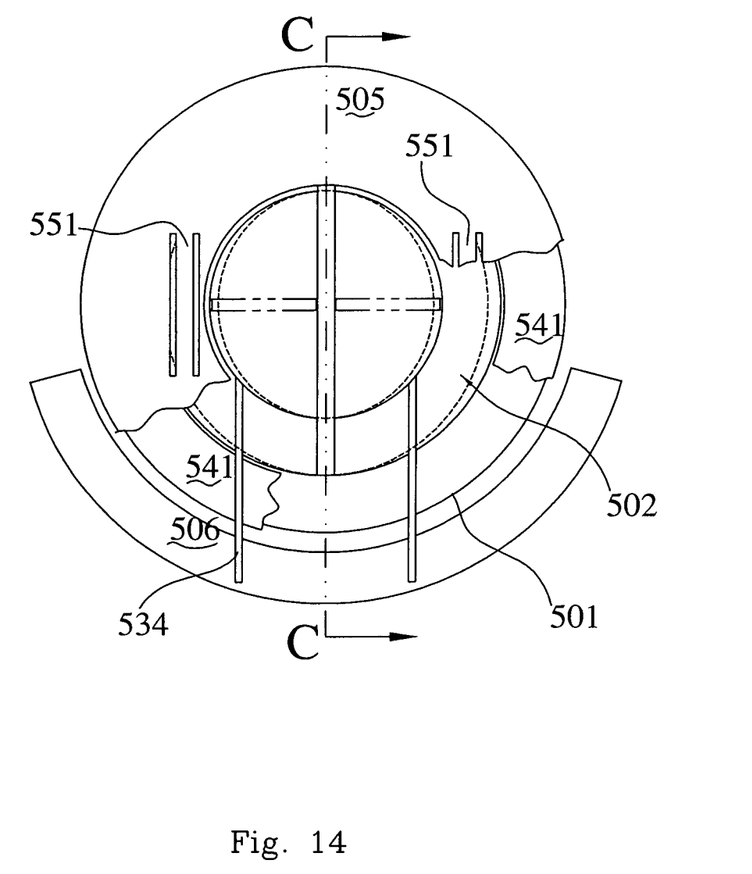
FIG. 14 is an enlarged diagrammatic top plan view, in partial section, showing the structure of the adhesive sheet type holding device for mounting onto a wall shown in the FIG. 13 assembled.
Figure 15:
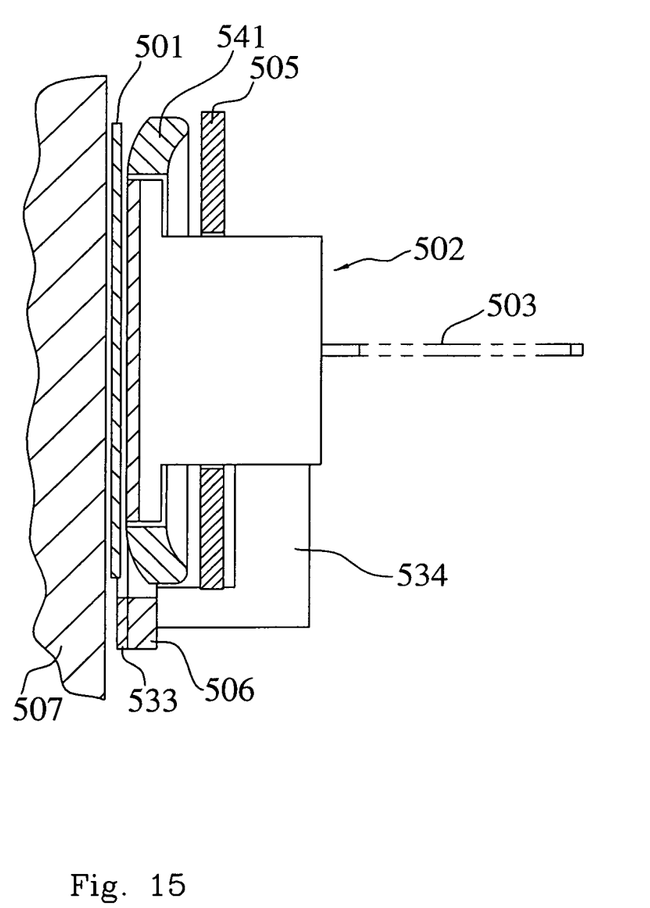
FIG. 15 is a diagrammatic cross sectional view taken along LINE C-C in FIG. 14.

In the third embodiment of the present invention, as shown in FIGS. 13-15, an adhesive sheet type holding device for mounting onto a wall includes an adhesive paper sheet 501, a base 502, a friction plate 506, a pressing ring 541, a pressing plate 505, and a holder 503 (only shown in FIG. 14).

The structure of the third embodiment is similar to that of the second embodiment, except that the friction plate 506 is connected with the base 502 via detachable connecting rods 534 and is directly pressed against the wall 507 beyond the area of the adhesive paper sheet 501. Since some adhesive paper sheet tends to slide on the wall after they have been pressed for a long time, a material with high coefficient of friction 533, such as foamed rubber and cork, is provided on the surface of the friction plate 506. The connecting rods 534 connected with the friction plate are inserted into the corresponding holes in the base and connected with the base, and the adhesive sheet type holding device for mounting onto a wall may be stuck onto the wall before or after the friction plate is assembled on the base during the assembly. The holder 503 may be connected to the base 502 or the connecting rods 534 of the friction plate 506.

The pressing ring 541, made of thick and soft materials, has a ring shape with its inner ring projecting towards the adhesive paper sheet, like the above structure. Since the pressing ring 541 is thick, the pressing foot does not have to be projected downwards, as that in FIG. 11 and the short springs are no longer used.

In use, the base 502 is pressed onto the wall 507 by the pressing plate 505, the long spring 551 firstly presses the base 502 flatly against the wall, and then the pressing ring 541 is pushed by the pressing plate 505 to be deformed and to gradually contact and press the adhesive paper sheet 501 from the center to the outer periphery thereof. Thus, the air between the adhesive paper sheet 501 and the wall 507 is continuously squeezed out from the center to the outer periphery. After that, the friction plate 506 connected with the base 502 by the connecting rods 534 can be directly pressed against the wall 507.

It has been proved through study that the center portion of the adhesive paper sheet tends to be penetrated by the molecules of air due to the force from the base so that the air penetrates between the adhesive paper sheet and the wall through the base and the adhesive paper sheet. Therefore, the air tightness of the center portion of the adhesive paper sheet should especially be enhanced. In order to achieve a desired air-tight effect, on one hand, the base and the adhesive paper sheet can be made of materials with a high gas barrier property, on the other hand, an air barrier layer may be provided on the surface of the center portion of the adhesive paper sheet and it may be metal foil or PVDC or the like.

Figure 16:
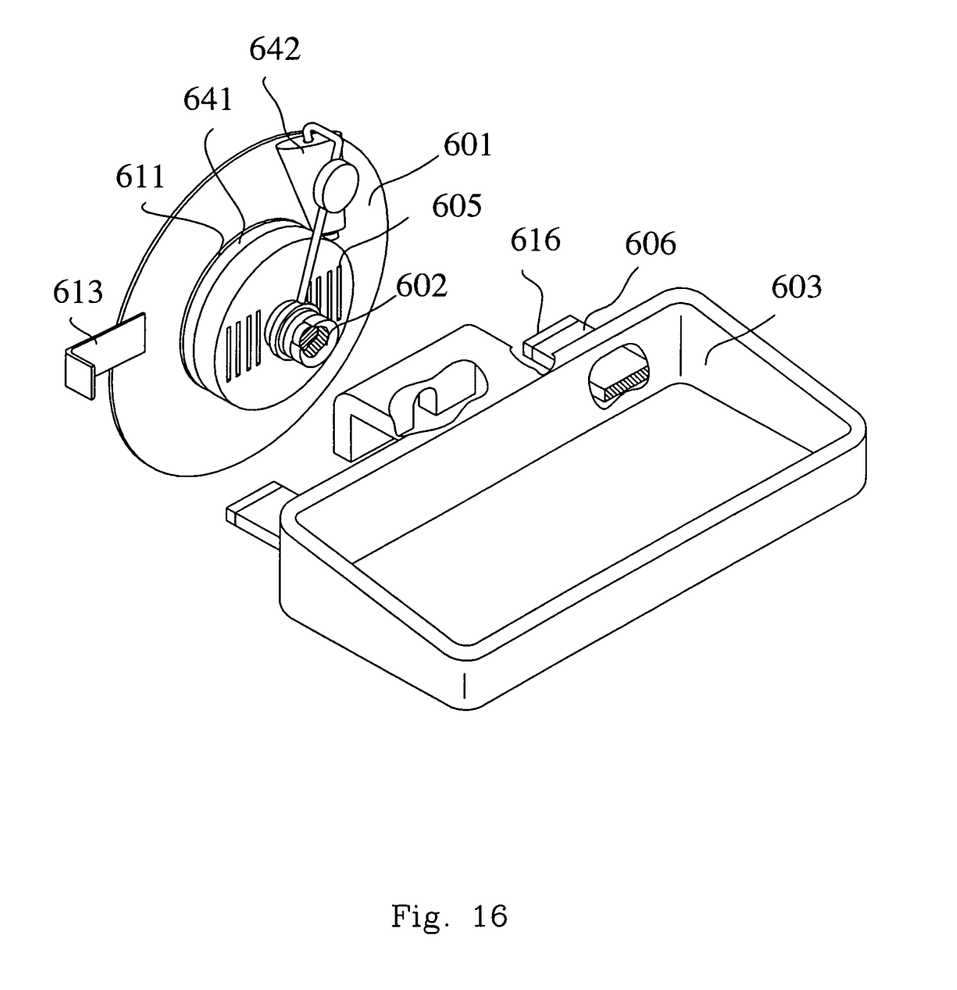
FIG. 16 is an exploded diagrammatic front perspective view showing the structure of the adhesive sheet type holding device for mounting onto a wall according to a fourth embodiment of the present invention.

In the fourth embodiment of the present invention, as shown in FIG. 16, an adhesive sheet type holding device for mounting onto a wall includes an adhesive paper sheet 601, a base 602, a pressing ring 641, a pressing roller 642, a pressing plate 605, a peeling piece 613, and a holder 603.

The structure of the fourth embodiment is similar to that of the second embodiment, except that a piece of aluminum foil 611 is stuck between the base 602 and the adhesive paper sheet 601 and has an area slightly larger than that of the base 602. Thus, better air-tight effect can be achieved by way of an excellent gas barrier property of the aluminum foil layer.

The holder 603 has a shape of a basket ring and is provided on the base 602. The friction plate 606 is fixed on the side of the basket ring shaped holder 603, which is towards the wall. The friction plate 606 is provided under the adhesive paper sheet 601 and is directly pressed against the surface of the wall. The friction plate 606 is also provided with a friction sheet 616 with a high frictional coefficient on the surface thereof, which is towards the wall. When a heavy object is placed on the holder, a torque applied on the base will be generated. The torque pulls and detaches the base from the wall while it presses the friction plate onto the wall. The sizes of the device can be so designed that the maximal static frictional force between the friction plate and the wall will be enough to bear the weight of the object and the holder within the maximal static frictional force. Thus, the friction plate bears all of the weight, while the base only bears the force perpendicular to the wall. Therefore, the adhesive sheet type holding device for mounting onto a wall according to the embodiments of the present invention can bear large loads and can be fixed on the wall securely and durably.

What is claimed is:

1. A holding device with a securing flat sheet for mounting onto a wall, comprising:
    a base in a shape of a plate with a flat bottom surface and a boundary;
    a holding means for supporting an object, said holding means being connected with said base;
    a securing flat film sheet being air tight, which has a front side and a back side, and is tightly securable onto a wall at said back side in flat sheet form and is stuck on the flat bottom surface of said base at said front side, wherein said securing flat film sheet is configured to extend beyond the boundary of said base to an extent to provide an extended region in flat sheet form, said extended region prevents air from penetrating into a portion of said back side beneath said base via space between said extended region and the wall when said back side in flat sheet form comes into tight contact with the wall due to adsorption affinity so that the holding device is secured onto the wall; and
    a pressing ring made of resilient material, which is a separate component, and is provided around said base so as to press said securing flat film sheet onto the wall, said pressing ring having a concave shape with an inner periphery projecting towards the extended region and an outer periphery, and being configured to sequentially press said securing flat film from the inner periphery of said pressing ring to the outer periphery of said pressing ring to make air between said extended region and the wall out of space therebetween so that air-tight is achieved therebetween, preventing air penetrating into the portion of said back side beneath said base via the space between said extended region and the wall.

* * * * *